J. KNEESHAW.
EDUCATIONAL APPLIANCE.
APPLICATION FILED NOV. 2, 1915.
1,183,570.
Patented May 16, 1916.
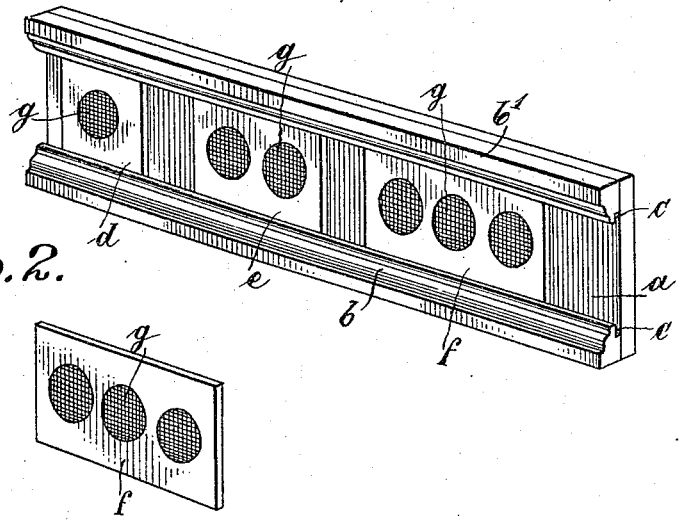
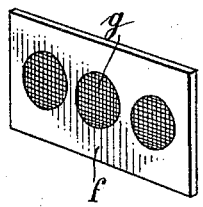
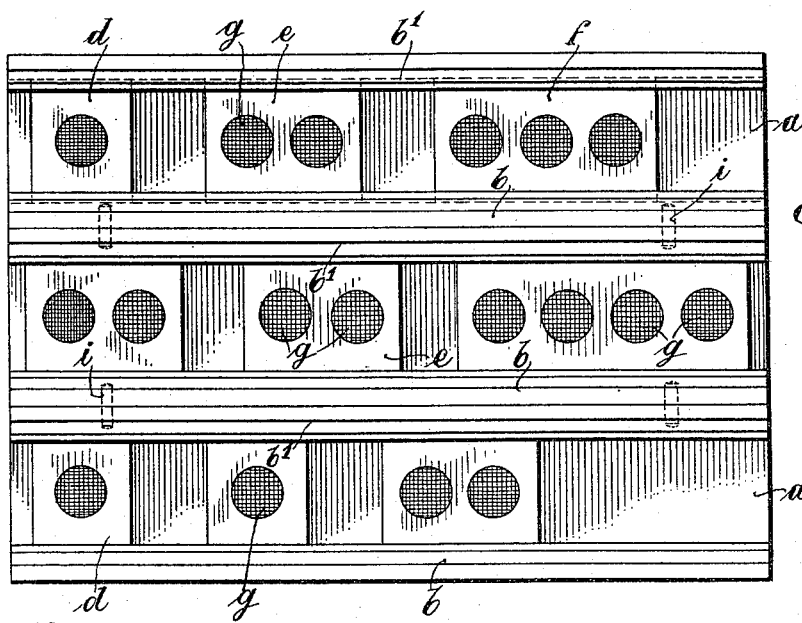
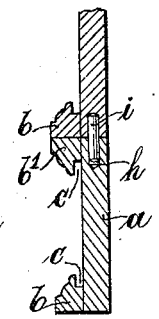
Witnesses:
W. H. Hawkins
L. C. Schmidt
Inventor
John Kneeshaw
By his Attorney
L. K. Böhm

UNITED STATES PATENT OFFICE.

JOHN KNEESHAW, OF NEW YORK, N. Y.

EDUCATIONAL APPLIANCE.

1,183,570.  Specification of Letters Patent.  Patented May 16, 1916.

Application filed November 2, 1915. Serial No. 59,176.

*To all whom it may concern:*

Be it known that I, JOHN KNEESHAW, a citizen of the United States of America, and a resident of New York, county of the Bronx, State of New York, have invented certain new and useful Improvements in Educational Appliances, of which the following is a specification.

This invention has reference to an educational appliance and pertains particularly to an appliance purposed to be used during instruction in arithmetic.

In institutions of tuition, such as public and private schools for instance, or in home instruction when the rudiments or first principles of science are taught it is advisable to aid the child, during teaching it, by some mechanical means to facilitate the understanding or conception. This applies particularly to arithmetic, especially in its rudimentary teachings.

It is the purpose of the present invention to produce an educational appliance for instruction in arithmetic, especially in rudimentary teachings which aids the child in easily understanding the object lesson by intuition. By looking at the novel appliance as set up or composed by the teacher the child perceives and comprehends the idea or result in question. Furthermore the novel appliance may be so constructed as to concentrate the child's mind completely on the spots, symbols, numbers or representations of objects shown and all features, parts or the like which may distract the attention of the child may be omitted. In addition to these main objects care has been taken to produce an educational appliance which is very easily operated. By simplicity in construction the cost of production has been reduced to a minimum and it has been sought to produce a neat and desirable article, all as will be described hereinafter with reference to the accompanying drawings in which:

Figure 1 represents in perspective view a simple educational appliance embodying in desirable form the present improvements. Fig. 2 illustrates in perspective view, a single plate with symbols thereon adapted to be applied and removed from the appliance. Fig. 3 shows, in face view, a plurality of the devices shown in Fig. 1 adapted to be assembled and separated by a simple operation. Fig. 4 is a cross section illustrating the joint of two neighboring appliances.

Similar characters of reference denote like parts in all the figures.

In the drawing in Fig. 1 $a$ represents a frame made of wood, metal or artificial compositions. The frame is provided with longitudinal strips $b$, $b^1$ integrally formed with or attached to its front top and bottom portions. An inner groove $c$ is formed in each strip, as best shown in Fig. 4. The appliance further comprises a plurality of thin plates of which three, $d$, $e$, $f$, are shown in Fig. 1. These plates likewise may be formed of wood, metal, or composition. The plates are rectangular and adapted to be shifted in and taken out of the frame. Each plate is provided with one or more symbols; for instance black or colored spots $g$ are shown on the plates in Fig. 1. The spots are preferably circular in shape and for rudimentary instruction of one color. However various colors may be used to designate a single unit or a multiple thereof.

Assuming that the frame is empty and the instruction begins then a symbol plate with one spot is shifted into the frame which, say, represents the numeral 1. If now a second symbol plate is shifted in with one spot thereon representing the numeral 1 then by addition the result 2 is found. If one plate with one spot is in the frame and a plate with two spots is inserted then the result 3 is easily explained by the teacher and understood by the child. Likewise other additions may be made. For subtraction the frame is filled with a certain number of plates and one or more taken away leaving only the desired number of spots in the frame which is easily read and understood by the child. The described elementary operations present the advantage that solely the number of spots forming the final result are visible to the child and no mistake can be made and clearness is the great object in rudimentary teaching by intuition. In the described way results of multiplication, division and fractions may be arrived at and finally made visible.

The appliance so far described is exceedingly cheap and simple and therefore may be acquired by any child, say for home study. For a large number of pupils and in complicated problems a plurality of the appliances may be united as shown in Fig. 3. This is simply effected by providing an opening $h$ in the top portion of the frame and a coinciding opening in another frame in which a peg or dowel pin *i* is glued. Several joints like this may be provided and if one appliance is to be assembled with another then the pegs are simply let down into the openings, as best shown in sectional Fig. 4, whereby a second, third or more appliance may be united as shown in Fig. 3.

The plates *d*, *e*, *f* herein described contain colored spots but other characters may be produced thereon such as numerals, fractions, pictures of birds, animals or letters. From the letters words may be formed which show the proper spacing apart of the single letters. Assuming now that a certain number of square plates, say four, contain each the fraction ¼ to be added then it is easily found that the four fractions make 1. If subtraction shall be taught then one plate for instance may be removed showing then that ¾ remain and so forth. Furthermore letters may be produced on those square plates for illustrating the addressing of envelops so arranged that the proper distance between the different lines may be shown.

The described appliance may also be used for showing thereon the home lessons for the child to be copied in school. This renders it unnecessary for the teacher to write the home lessons on a blackboard. Take for instance arithmetical lessons to be solved at home, then all the single data may be shown on the appliance and in a clear printed style. The child certainly can copy clear printed style better and quicker than the hand writing of the teacher.

I claim as my invention:

1. An educational appliance comprising a frame with top and bottom front strips forming each a groove with the frame, means in the top surface of the frame adapted to secure a like appliance, and a plurality of symbol plates adapted to be inserted into and removed from the appliance.

2. An educational appliance composed of a plurality of independent sections each comprising a frame with top and bottom front strips forming each a groove with the frame, openings in the top portion of one frame, dowel pins in the frame of the second section adapted to lodge in said openings so that any number of appliances may be assembled, and a plurality of symbol plates adapted to be inserted into and removed from each section.

Signed at New York, N. Y., this 30th day of October, 1915.

JOHN KNEESHAW.

Witnesses:
SIGMUND RUBIN,
LILLEY E. SCHMIDT.

Copies of this patent may be obtained for five cents each, by addressing the "Commissioner of Patents, Washington, D. C."